Patented Nov. 10, 1953

2,658,851

UNITED STATES PATENT OFFICE 2,658,851

SALT DENTIFRICE

Jacques Edwin Brandenberger, Neuilly-sur-Seine, and François Jean Bossard, Paris, France No Drawing. Application April 11, 1950, Serial No. 155,352. In France April 20, 1944

Section 1, Public Law 690, August 8, 1946
Patent expires April 20, 1964

4 Claims. (Cl. 167—93)

This is a continuation in part of prior application Ser. 663,250 filed April 18, 1946, entitled "Dentifrice Composition," now abandoned.

This invention relates to dentifrices and particularly to saline dentifrice pastes and it has for its main object to provide a dentifrice paste of the above mentioned type which permits to obtain a combination of effects, relative to the stability of the paste, to oral hygiene and to the therapy of inflammatory oral diseases which have not been attained by known saline dentifrices or by any other dentifrice composition.

Preparations which are usable as a dentifrice and especially tooth pastes should conform to certain physico-chemical and hygienic standards and this result is usually obtained by using a basic pattern for the composition which produces some of these effects, while the other effects which are deemed to be necessary or desirable are produced by the addition of substances believed to have a specific effect, which are incorporated into the composition and applied with it.

Among the physico-chemical qualifications of a composition or mixture which are desirable or even indispensable for a tooth paste complete stability is the most important property. Next to it, a suitable consistency or plasticity of the tooth paste is required which determines the practical usefulness from the physico-chemical standpoint. Complete stability has only been achieved when the composition or mixture suffers neither mechanical nor chemical decomposition or disintegration, nor any other change, such as crystallization, either when stored or when in contact with the air or with moisture or with any substance normally or frequently contained in the air. The salve or paste like consistency, on the other hand, must be preserved during long storage periods until the paste is used, as it is necessary to allow distribution of the active ingredients during actual oral application over a large area and over a most irregular surface with a large number of small and large crevices, depressions, recesses and protuberances. During this distribution process cohesion between particles and groups of particles should not be destroyed to such a degree that inactivity results.

For producing the desired standard properties it has been common practice to use an emulsion of a fatty substance, such as oil, in water, to which a detergent has been added as an emulsifying agent, an abrasive being mixed with the said emulsion to form a paste.

The emulsifying detergent, usually a soap, is believed to have a salutary cleansing effect on the teeth and gums and to be the most effective active substance of the tooth paste while it acts simulaneously as the emulsifying means permitting the introduction of a sufficient quantity of oil or other fatty substances to form a stable paste and to smooth materially the action of the abrasive.

The standard pattern for the composition was thus based on the double activity of the soap or detergent as the agent producing the required hygienic and physico-chemical effects.

In addition to small quantities of flavoring substances, substances believed to be more effective cleansing or disinfecting agents are sometimes added to the basic composition, without however disturbing the balanced condition of the same. Manifestly only a very limited quantity of matter foreign to the emulsion can be added without causing a change in the desirable consistency, as the emulsion has already to hold the abrasive in a suspended condition. Moreover such added matter, even if evenly distributed originally, will have a tendency to segregation as soon as a certain limit is overstepped, thus making most additions either ineffective or impractical.

The whole problem of producing a balanced and self contained system of desirable physico-chemical properties with the minimum of constituent substances became again an open problem when it was found that the basic component of the above described systems, viz. the soaps or detergents, by virtue of their alkalinity, produce undesirable effects on the tissues of the gums. Moreover the surface tension lowering property of the detergents, which is just the property making them highly effective as an emulsifying agent, proved to be a major disadvantage as the detergents by virtue of this property enter the small recesses and crevices which are unprotected by epithelial tissue, deepening and widening these recesses and causing inflammations. The recession of the gums has been repeatedly connected with the use of detergents by medical research workers.

Tooth pastes without detergents or wetting agents have therefore been proposed repeatedly during the last years. However many of these proposals did not take into consideration that the soap is not merely an active cleansing agent, but is also the basical compound for the stability of the emulsion and therefore for the consistency and the stability of the paste.

It has been proposed to replace the soaps or other detergents by substances exercising a disinfecting action, such as sodium perborate or sodium tetraborate, and it has also been proposed to use salt (sodium chloride) either as a flavoring agent or as the active agent of the paste. However these proposals did not also propose to change the basic pattern of the composition by the elimination of soap or detergents. The soap still was used as the emulsifying agent and was therefore present in sufficient quantity for undesirable physiological action.

When sodium chloride is used as a flavoring substance—much in the way in which condiments are used to flavor foods—the percentage within the paste is so small that no physiological, bactericide or other action of the paste may be ascribed to its presence, as can be ascertained by comparison with an unflavored paste. In order to obtain a bactericide or favorable physiological or therapeutic effects a high percentage of salt is necessary, which exceeds by far that used for flavoring purposes.

In view of the beneficial results obtainable by the application of salt in the proper concentration for action, the use of salt as the active substance of the paste has been proposed. To obtain the necessary high concentration, the salt, according to this proposal, is used in its solid or crystalline form and is held or embedded in this crystalline form within a plastic body mass, containing several colloidal ingredients and a detergent. The mass was specially designed for this purpose and it had to bind all the water to prevent it from dissolving the sodium chloride. The salt was thus brought into the mouth in its crystalline form, in order to be dissolved by the saliva.

This method of using sodium chloride is however accompanied by serious disadvantages. Salt in crystalline form exercises an intensive abrasive action, which may injure and wear down the enamel of the teeth so that it cannot be used in connection with tooth pastes applied by a tooth brush. Moreover, while sodium chloride will dissolve in the saliva in the course of time, a major part of the crystals which are provided with sharply pointed edges and projections does not dissolve in the short time available, partly on account of the protection given by the body mass. Laceration of the gum tissue and especially of the zone where the gum tissue joins the teeth is the consequence to be expected from such an intensive abrasive action and the net result of its application would not be a reduction of the danger of infection but an increase, as the bactericide action passes rapidly while the damaged tissue needs much time to recover.

In addition, to teeth with receding gum, the single contact of salt crystals in dissolution provokes a painful and often intolerable sensation.

From the above it will be seen that it is not so much the selection of the active substance of the tooth paste, but the way in which it is incorporated and the method of using it for obtaining a stable and uniform product, containing said substance in an active form and in the desirable percentage which constitutes the main problem.

Accordingly it is the main object of the invention to provide a tooth paste based on sodium chloride as its active ingredient which is not only free of the inconvenient and damaging effects of the solid salt crystals, but which is also a balanced and stable product in which the active ingredients are not only physiologically active, but in which they also exercise a physico-chemical action on consistency and stability, protecting the product against separation, decomposition or deterioration.

According to the invention a concentrated, substantially saturated, aqueous solution of sodium chloride, for instance a solution of 250 parts by weight for 1000 parts of the solution is made to which a quantity of glycerine is added which is capable of maintaining the sodium chloride in a dissolved state should some of the water or all the water which is capable of evaporating, disappear. The dissolved condition of the sodium chloride is thus maintained even under adverse conditions. Petrolatum and paraffin oil is emulgated within this solution by means of colloidal kaolin (bentonite) to which finely ground calcium or magnesium carbonate has been added. A very stable emulsion is the result in which the solution of sodium chloride in water mixed with glycerine forms the continuous phase, while bentonite mixed with calcium or magnesium carbonate, ground as finely as obtainable, serves as an abrasive and as an emulsifying agent for emulgated fatty substances which smooth the action of the abrasive and also act as solvents for deposits, such as dental tartar, tars and nicotine.

The above product, described generally may be prepared in the following propositions:

A solution of 11 parts by weight of sodium chloride in a mixture of 30 parts of water and 15 parts by weight of pure glycerine is first prepared.

The composition of the tooth paste is then the following:

- 56 parts by weight of the above described solution
- 12 parts by weight of bentonite (colloidal kaolin)
- 25 parts by weight of calcium (magnesium) carbonate
- 3.5 parts by weight of petrolatum
- 3.5 parts by weight of paraffin oil Total 100 parts by weight This paste is made in the following way:

The bentonite is intimately mixed with the calcium carbonate, which is ground to extreme fineness, and is then added to the above mentioned solution containing the sodium chloride which has been heated to approximately 212° F. In this way a decoction is obtained from which all the air which may have been retained by the solid particles has been expelled. At this temperature, the products as prepared are made sterile, the pathogenous germs being destroyed. The liquid containing the solid particles is then cooled to about 120° F. Then, while the liquid is agitated, the petrolatum and the paraffin oil is added which, by virtue of the presence of the suspended bentonite, is immediately distributed throughout the solution containing the suspension and which forms an extremely stable emulsion.

It will be understood that in many circumstances, for instance in regions where a high humidity prevails, or in those cases in which it is possible to use hermetically sealed containers for the tooth paste, the glycerine content of the solution may be reduced, as crystal formation under these circumstances is unlikely.

Further it is to be understood that those substances which serve secondary purposes, such as dyestuffs, flavoring substances, perfumes, may be added in the usual and well known proportions when the emulsion has been prepared. Only small quantities of these substances are used and they may therefore be readily distributed within the paste. It is however to be noted that the paste has an agreeable flavor even without special flavoring, as the strong saline flavor is tempered and somewhat covered by the sweet flavor of the glycerine.

The main advantage of the dentifrice paste according to the invention consists in the fact that it permits the application of a concentrated solution of sodium chloride to the gums, teeth and other parts of the mouth, the concentration being so high that the physiological, bactericidal and therapeutic effects of the salt may fully develop, while at the same time the formation of crystals with its attendant danger of injury to teeth and tissues is completely eliminated. Crystals cannot form even after a long storage period. This is an added advantage, as it is the common practice to fill the paste directly into tubular containers provided with a threaded nipple or mouthpiece, closed by a cap, which mouthpiece would immediately get clogged upon formation of crystals, as the closure device is not absolutely airtight, so that water which has not been bound can evaporate.

It will be noted that the tooth paste possesses a combination of useful properties not obtained so far by known pastes, using a minimum of components, all or most of which contribute to the maintaining of the desired stability and consistency of the product.

In addition to the effects explained above and which are due to the presence of sodium chloride in concentrated solution, there is a polishing effect due to the presence of bentonite and calcium carbonate, which in their turn also act as emulsifying agents permitting the incorporation into the solution of a relatively considerable quantity of oil and other fatty material. This fatty material and oil in its turn binds a considerable quantity of the solution and also attenuates and smoothes the abrasive properties of the bentonite and the calcium carbonate. Moreover the fatty materials exercise a dissolving effect on the tars and on the nicotine and its decomposition products which tend to form a deposit on the teeth of smokers. A similar effect is also exercised on the dental tartar.

One of the most important effects of the sodium chloride which is developed in the state of concentrated solution and in this state only, consists in its positive and negative therapeutic activities. The positive therapeutic effect manifests itself in the case of gingitivitis and of inflammation of the gum tissues in general. Tests have shown that the application of a concentrated solution of sodium chloride is one of the best therapeutical agents available against this condition.

Moreover a concentrated salt solution has also a bactericide and a hypertonic effect and is an agent preventing putridity. It is also a solvent for mucin. As the gums always contain pockets with material in the state of decomposition which are basic causes for many inflammatory processes and perhaps even for dental caries which is promoted and possibly even initiated by the presence of mucin, the preventive action of the concentrated salt solution which removes both cannot be overestimated. The hypertonic or osmotic action of the concentrated solution promotes the secretion of saliva from the glands to an extent which surpasses the effect of all other chemical agents which are usable in the mouth without possible damage to tissues and organs. The saliva in its turn is a natural germicide and cleansing fluid.

It will therefore be clear that the use of sodium chloride, held within a tooth paste in the form of a physiologically active concentrated solution and in a manner preventing crystallization, which solution is simultaneously also a means for maintaining the paste in a stable condition by forming the continuous phase for dispersed and suspended further active ingredients, is a marked improvement over other forms of using sodium chloride and over other active agents.

It will also be clear that the specific description is provided by way of example and that nonessential steps and ingredients may be changed or suppressed, and that additions may be made, without departing from the principle of the invention as expressed in the annexed claims.

Having described the invention what is claimed is:

1. A dentrifice composition comprising 41% of a substantially saturated aqueous solution of sodium chloride, of 15% of glycerine mixed with said solution, a mixture of 12% of bentonite and 25% of calcium carbonate and of 7% of petrolatum and paraffin oil, emulgated in said first named mixture.

2. A dentrifice composition of uniform paste-like consistency comprising more than 41% of a crystal-free concentrated hypertonic sodium chloride solution, with the liquid solvent and the dissolved salt in such proportion that the sodium chloride content is not less than necessary to maintain the solution in a near saturated condition, the said concentrated hypertonic solution being retained in its liquid state within the paste by forming part of an emulsion held and stabilized by chemically neutral emulsifying agents.

3. A dentrifice composition, as claimed in claim 2, wherein the solvent for the sodium chloride is an aqueous solution with the addition of glycerine approximately in the proportion of 1 part by weight of glycerine to 2 parts by weight of water, to prevent crystallization of the sodium chloride in the event of evaporation of some of the water.

4. A dentrifice composition as claimed in claim 3, wherein the emulsion is stabilized by means of bentonite with the addition of a finely pulverized abrasive and of a fatty oil forming binder between the abrasive and the bentonite.

JACQUES EDWIN BRANDENBERGER.
FRANÇOIS JEAN BOSSARD.

References Cited in the file of this patent

UNITED STATES PATENTS

| Number | Name | Date |
| --- | --- | --- |
| 1,482,741 | Giesy | Feb. 5, 1924 |
| 1,645,852 | Brownlee | Oct. 18, 1927 |
| 1,933,977 | Harris | Nov. 7, 1933 |
| 1,968,858 | Sheffield | Aug. 7, 1933 |
| 2,089,529 | Behr | Aug. 10, 1937 |
| 2,194,218 | Dickerson | Mar. 19, 1940 |

FOREIGN PATENTS

| Number | Country | Date |
| --- | --- | --- |
| 807,271 | France | Oct. 12, 1936 |
| 991,640 | France | June 27, 1951 |

OTHER REFERENCES

Journal American Dental Association, volume 30, July 1, 1943, pages 1036 to 1045, "Abrasion of Teeth by Commercial Dentrifices." Page 1040 pertinent.

Journal Dental Research, "Highfalutin Dupery," pages 497 to 506. Pages 501 and 502 pertinent. 1919.

U. S. Dispensatory, 24th edition, Philadelphia, 1947, pages 509, 1069 and 1071.